Sept. 30, 1924.  
J. C. MALONE  
CHUTE OR SLUICEWAY  
Filed March 17, 1924  
1,510,288  
2 Sheets-Sheet 1
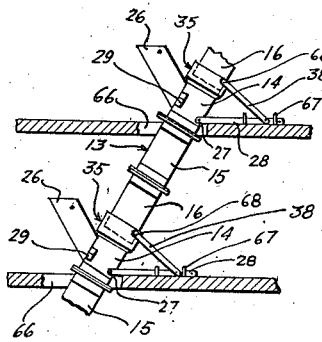
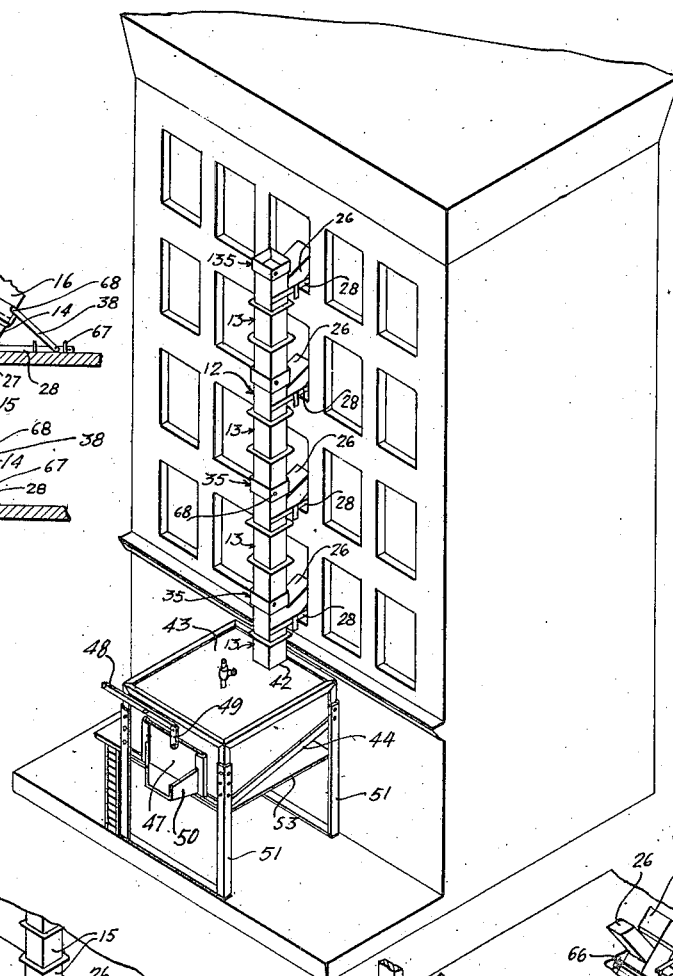
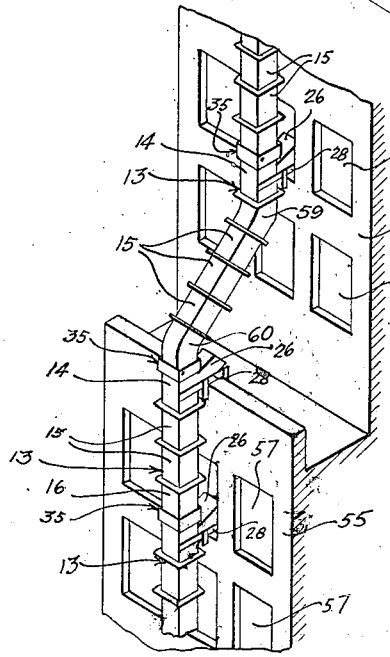
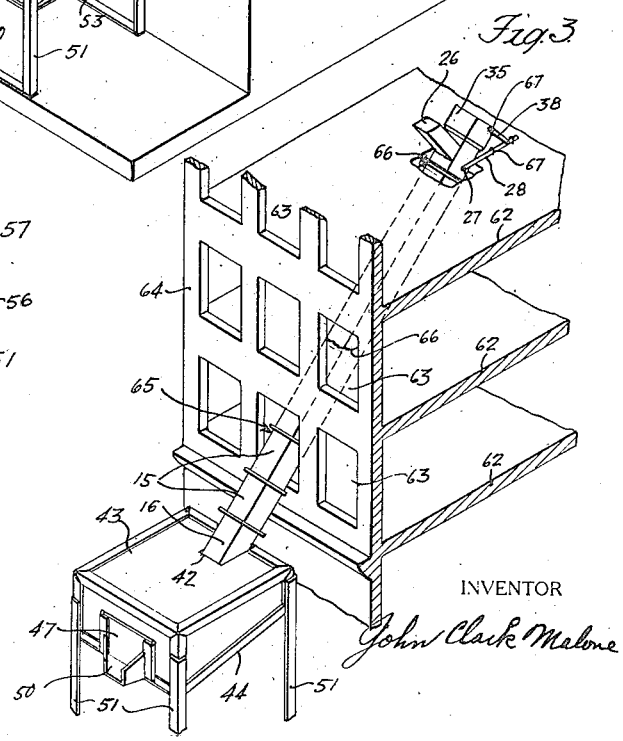
INVENTOR  
John Clark Malone

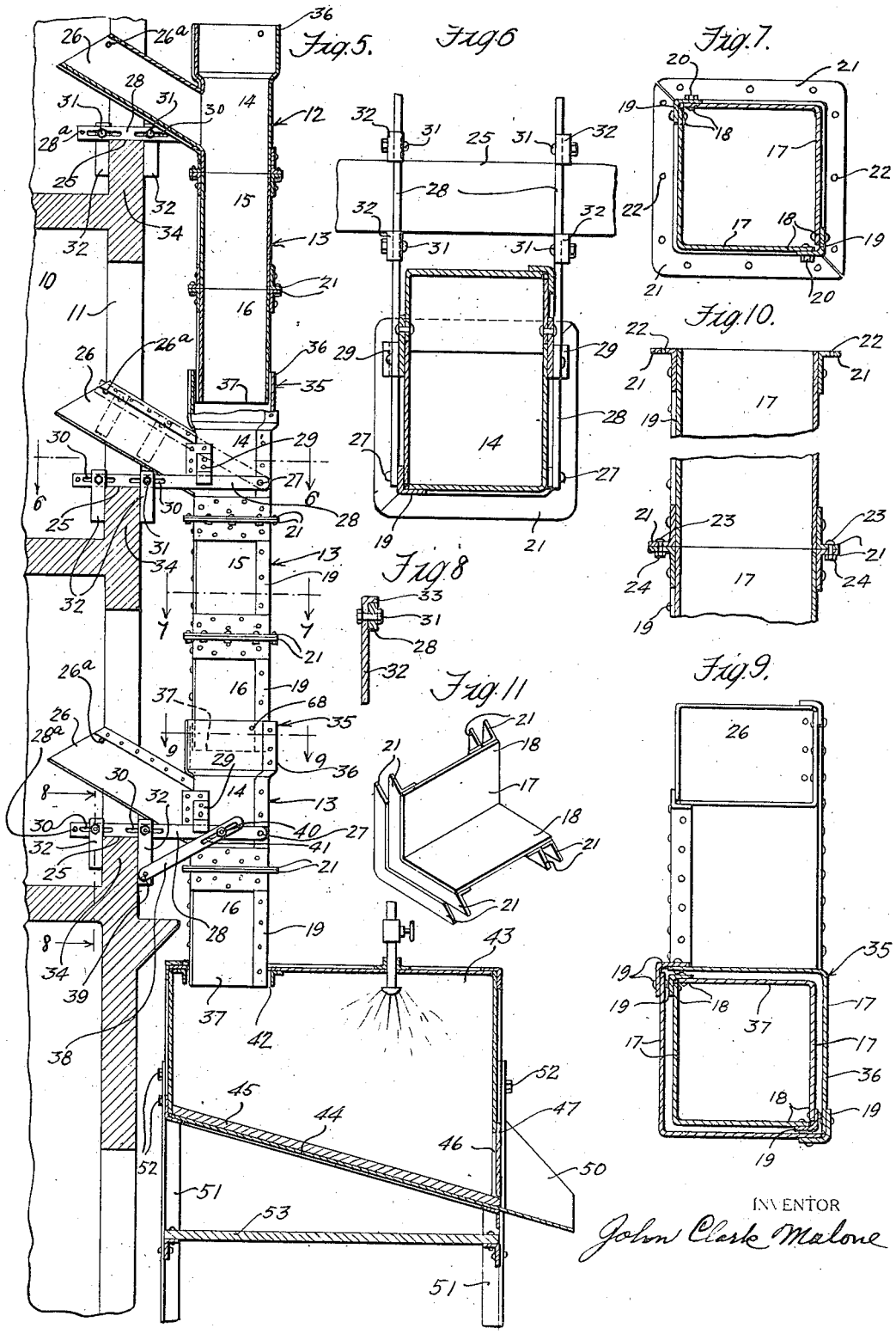
Sept. 30, 1924.
J. C. MALONE
CHUTE OR SLUICEWAY
Filed March 17, 1924    2 Sheets-Sheet 2
1,510,288
INVENTOR
John Clark Malone Patented Sept. 30, 1924.

1,510,288

UNITED STATES PATENT OFFICE.

JOHN CLARK MALONE, OF NEW YORK, N. Y.

CHUTE OR SLUICEWAY.

Application filed March 17, 1924. Serial No. 699,887.

*To all whom it may concern:*

Be it known that I, JOHN CLARK MALONE, a citizen of the United States, residing at New York, in the county of New York, in the State of New York, have invented new and useful Improvements in Chutes or Sluiceways, of which the following is a specification.

My invention relates to means for the disposition of refuse accumulating on the floors of buildings, towers, etc., which are undergoing construction or demolition, or for the disposition of such materials from buildings in use which require the continuous or temporary utilization of such a means.

This means comprises a chute which has for its first object portability and for this purpose is readily attached to or removed from the buildings, etc., in separate units. If necessary the units themselves may be broken up into smaller sections thus making the chute more easily transportable.

A further object is to make each unit separately attachable to the building, etc., preferably one on each floor of the same, thus such a number of units will be used to form a chute as will accommodate the height of the building.

Another object is to eliminate adjustments between the units when they are attached by providing a telescopic connection between them. This renders the chute applicable to buildings, towers, etc., having floor spaces of different heights.

Still another object is to make this chute of durable material, to enable it to be manufactured at little cost and to provide a durable temporary storage tank into which the chute empties, and which tank is vertically adjustable to the chute end when the chute is used particularly for the construction and demolition work on buildings, etc.

Other objects and advantages will hereinafter appear.

The chute, in brief, consists as noted above of units, which in use are attached in a vertical or oblique alignment to the building, etc., each floor preferably supporting a unit. Each unit itself consists of a number of sections bolted together, one of which carries a refuse receiving mouth portion on the level with the floor, window, or hole which supports the unit. The other sections of the units are practically alike in construction and are used in such numbers as are necessary to span one floor, etc., leaving an overlap to be taken up by the telescopic connection between the units, which connection thus eliminates adjustments between the same should the spaces from floor to floor differ. This sectional construction as stated in the object also serves shipping purposes. The lowermost unit may or may not empty the refuse into a temporary storage tank. This tank is commonly used in construction and demolition work on buildings, etc., and in my invention it is vertically adjustable in relation to the chute end.

Referring to the drawings,

Fig. 1 is a perspective drawing showing my chute in use on a building undergoing construction.

Fig. 2 is a perspective showing the invention applied to a building of a different type also undergoing construction.

Figs. 3 and 4 are respectively perspective and fragmentary views showing my invention in use on a building being demolished.

Fig. 5 is a side view partially in section of my invention shown in Fig. 1.

Figs. 6, 7, 8 and 9 are sections taken on lines 6, 7, 8 and 9 respectively of Fig. 5.

Fig. 10 is a fragmentary vertical section of one of the units.

Fig. 11 is a perspective of a section taken apart for transportation.

Referring now to Figs. 1, 2 and 5 numeral 10 indicates a building having as many floors as are shown by the windows 11, a vertical set of which serve to support a chute designated in general by 12, and comprising of units 13. Each unit consists of sections 14, 15 and 16 which in this case are ample to span the distance from window to window.

Each section (see Figs. 5, 7 and 10) is formed of two plates 17—17 bent at right angles and secured together at their ends 18—18 by means of angle irons 19—19 and bolts and nuts 20. To secure these sections together to form a unit the abutting ends carry angle irons 21—21 riveted thereto and provided with holes 22 through which project bolts 23 having nuts 24. This serves to securely connect the abutting ends of the sections and also renders them detachable from one another.

The sections 14 of each unit are practically on the level with the sills 25 of the windows 11 and are provided with mouth pieces 26 which project into the windows and are inclined so that when they receive the refuse the same will be gravitated to the sections 14. These mouth pieces 26 are of the same construction as the sections 14, 15 and 16 and may be fastened to the sections 14 in any desirable manner.

The mouth carrying sections 14 of each unit (see Figs. 1, 2, 3, 4, 5,) are supported on the building by the following means: Opposite sides of each section 14 carry (see Fig. 5) bolts 27—27 serving to pivotally secure arms 28—28 which project through the windows 11 and rest on the sills 25 of the same. The sides of the section having the bolts carry fixedly secured thereto lugs 29—29 which embrace the top and sides of the arms and prevent the section from turning about the pivot bolts 27—27. The purpose of this construction will be disclosed hereinafter.

The portions of the arms 28—28 resting on these sills are provided with slots 30—30 along which are adjustably secured by means of bolts and nuts 31, lugs 32. These lugs (see Figs. 6 and 8) are prevented from turning about the bolts 31 by having bent over portions 33 embracing the top edge of each arm 28.

Each unit 13 is first properly spaced from the wall of the building a distance generally decided by projecting cornices, etc. on the same and then the lugs 32 are moved along the arms 28 until the two lugs on each arm abut against the sides of the still wall 34 and are then secured in that position. It will therefore be understood that the arms of each unit serve to support that unit and all the sections comprising the same and that the lugs 32 serve to properly space the unit and hold the same in position.

It will be noted from the drawings that the units overlap and that the same is taken up by telescoping connections indicated in general by 35 which connections are made by enlarging the upper ends 36 of the section 14 to receive the ends 37 of the section 16 of the units supported above. This telescoping connection also serves to aid the lugs 32 to hold the unit spaced thereby in vertical position and to further aid the lugs in this purpose they may be provided for example with a link 38 as shown in the lowest unit 13 in Fig. 5. This link is pivoted to one of the lugs 32 at 39 at one end thereof and the other end of the link secured by means of bolt and nut 40 to the arm 28 which supports the lug 32 pivotally securing the other end of this link. The end of the link 38 which is secured to the arm 28 has a slot 41 to permit the adjustment of the lug in relation to the arm.

From the above it will be understood that any number of sections 15 may be used if necessary to span the floor or window space and that the telescopic connections will take up the varying distances between the floors of the building and that such a number of units 13 may be used as there are floors in the building, and that any number of chutes may be put up on the same building.

In certain buildings or towers, etc. holes may be especially made in the walls of the same for supporting the units and for admitting the mouth portions of the same, or may be mounted inside of the building by cutting holes in the floors of the same in vertical alignment for the chute and resting the arms of each unit upon the floor.

When attaching a chute to a building it will probably be more practical to assemble the necessary sections together to form a unit and then hoist it into place on the window sill or holes for the same. When the units are taken down they may be shipped as they are or may be broken up into sections for transportation and for further faciltating the transportation of the sections, the sections 15 and 16 may be taken apart at their corners 18 and shipped as shown in Figure 11. In regards to the section 14 the arms 28 of the same may be swung into dotted position shown in Figure 5 and held in that position by a pin or bolt projecting through hole 28ª of the arm into a hole 26ª of the mouth portion 26. This renders the sections 14 more easily transportable.

The lowermost unit 13 as shown in Figs. 1 and 5 consists but of sections 14 and 16, the latter of which enters opening 42 of a temporary storage tank 43 made preferably of sheet metal plates reinforced by angle irons and is substantially square when viewed from above. This tank has an inclined bottom 44 and the opening 42 is near the end of the tank where the bottom is the highest and therefore the refuse coming down the chute will strike the bottom 44 which is provided with a sound absorbing layer of wood 45 and gravitate down the incline to the other end of the tank where there is a discharge opening 46 normally closed by a vertically sliding shutter 47 controlled by a hand operated lever 48 and a connected link 49. Aligned with the opening 46 is a short chute 50 which guides the discharge of the refuse.

This tank is vertically supported at its corners on angle irons 51 and is vertically adjustable on the same, by holes and bolts and nuts 52. The angles 51 as shown rest on the sidewalk and carry the tank somewhat above the same so as to permit the passage of the pedestrians who are further protected by a layer of boards 53 supported on the angles 51.

The tank 43 may be provided with a spraying device as shown in Fig. 5 so as to concentrate the refuse and prevent dust when the discharge is made. This tank may be shipped as it is when it is taken down from the supports.

Fig. 2 shows my invention in use on the building having a wall 55 and an offset wall 56, both having windows 57. The top window on wall 55 carries a unit 13 and a distance from that window to the parapet is spanned by a unit supported on the parapet and comprised of two sections 15 and a section 16 to connect with the unit below.

The second story window 57 of the offset wall 56 carries a unit 13 comprising a section 14, a curved section 59, a number of sections 15 and another curved section 60 all bolted together and the last mentioned section 60 telescoping with the section 14 of the unit supported by the parapet. By skipping the first window on the offset wall sufficient incline is given to the connecting unit between the offset chutes thus enabling the material from the upper chute to gravitate to the lower chute.

Referring now to Figures 3 and 4 the units are shown in position on a building undergoing demolition.

When demolishing a building, it is customary to run a chute through the first floor window upward and obliquely through the building and the floors thereof to the top floor and the center of the same. This central position of the upper end of the chute at the top floor makes it easier to bring all of the refuse from all sides of that floor to the chute while in the meantime preliminary demolishing may go on on the floors below. When the top story has been removed the entire chute is lowered to the centre of the floor below and so on to the lower floors as will allow sufficient incline to the chute to gravitate the material.

Fig. 3 shows a building having floors 62 and corresponding windows 63 in the wall 64. The chute 65 is shown entering the first floor window and projecting upwardly and obliquely through openings 66 of the floors in the building.

The chute comprises the units 13 telescoping into one another and supported on the floors in the following manner:

The arms 28 of each unit are swung into a position shown in Figs. 3 and 4 so that they lie flat upon the floor and may be secured in that position by nails, etc. 67. To prevent each unit 13 from turning about the pivot bolts 27 and links 38 hereinbefore mentioned may be used to connect on one end with a bolt 68 on the section 14 and at the other end with a bolt to the slots 30 in the arms 28. These slots enable the section 14 to be secured in any angular relation to the floor.

What I claim is:

1. The combination with a building having floors and provided with openings to each floor, of a chute comprising a number of units, each unit detachably supported by a floor of the building, means providing telescopic connections between the units.

2. The combination with a building having floors and provided with openings to each floor, of a chute comprising a number of units, means upon each unit for detachably mounting each unit upon a floor of the building, means providing telescopic connections between the units.

3. The combination with a building having floors and provided with openings to each floor, of a chute comprising a number of units, each unit carrying a mouth portion entering the opening to the floor, means upon each unit for detachably mounting the unit in the opening to the floor, means providing telescopic connections between the units.

4. The combination with a building having floors and provided with openings to each floor, of a chute comprising a number of units, each unit comprising a mouth carrying section, one or more sections detachably connected to the first mentioned section, an end section detachably connected to the second mentioned section, means upon the mouth carrying sections for detachably mounting the units in the openings to the floors, means upon the mouth carrying sections and the end sections for forming a telescopic connection between the units.

5. The combination with a building having floors and provided with openings to each floor, of a chute comprising a number of units, each unit comprising a mouth carrying section, one or more sections detachably connected to the first mentioned section, an end section detachably connected to the second mentioned sections, means upon the mouth carrying sections for detachably mounting the units in the openings to the floors, means providing telescopic connections between the units.

6. The combination with a building having floors and provided with openings to each floor, of a chute comprising a number of units, each unit comprising a mouth portion carrying section, one or more intermediate sections detachably connected to the first mentioned section, an end section detachably connected to the second mentioned section, means upon any one of the above mentioned sections for detachably mounting the unit in the opening to the floors, means formed upon the mouth carrying section and the end section of each unit to telescopically connect the mouth carrying section of one unit with the end section of another unit, a receptacle adapted to receive material from the chute, means providing a telescopic connection between the end section of a unit and the receptacle, means for adjustably supporting the receptacle in relation to the chute end.

7. The combination with a building undergoing construction and having floors and walls and openings through the walls to the floors, of a chute comprising a number of units, means for detachably securing said units in vertical alignment in said openings comprising, two arms pivotally secured at one of their ends to opposite sides of a unit, the other or free end projecting into the openings of the wall and resting upon the same, slots in the free ends of said arms, two lugs adjustable along the slots of each arm and adapted to embrace the sides of the wall and to be secured in that position, lugs fixedly secured to the opposite sides of the unit and adapted to engage the arms and thereby hold the unit against turning about the pivot of the arms, means providing telescopic connection between the units.

Signed at New York city, (Manhattan) in the county of New York and State of New York, this 3rd day of March, A. D. 1924.

JOHN CLARK MALONE.